(12) United States Patent
Maertens

(10) Patent No.: US 11,821,347 B2
(45) Date of Patent: Nov. 21, 2023

(54) PARTICLE FILTER DIAGNOSTIC DEVICE

(71) Applicant: Vitesco Technologies GmbH, Regensburg (DE)

(72) Inventor: Steven Maertens, Toulouse (FR)

(73) Assignee: Vitesco Technologies GmbH

(*) Notice: Subject to any disclaimer, the term of this patent is extended or adjusted under 35 U.S.C. 154(b) by 0 days.

(21) Appl. No.: 18/007,890

(22) PCT Filed: Apr. 16, 2021

(86) PCT No.: PCT/EP2021/059936
§ 371 (c)(1),
(2) Date: Dec. 2, 2022

(87) PCT Pub. No.: WO2021/249681
PCT Pub. Date: Dec. 16, 2021

(65) Prior Publication Data
US 2023/0243288 A1     Aug. 3, 2023

(30) Foreign Application Priority Data
Jun. 11, 2020   (FR) ...................................... 2006122

(51) Int. Cl.
*F01N 11/00*  (2006.01)
*F01N 13/00*  (2010.01)

(52) U.S. Cl.
CPC ............ *F01N 11/00* (2013.01); *F01N 13/008* (2013.01); *F01N 13/009* (2014.06);
(Continued)

(58) Field of Classification Search
CPC ...... F01N 11/00; F01N 13/008; F01N 13/009; F01N 2550/04; F01N 2550/24;
(Continued)

(56) References Cited

U.S. PATENT DOCUMENTS 10,933,363 B2    3/2021   Wunderlich et al.
2005/0000207 A1  1/2005   Christl
(Continued)

FOREIGN PATENT DOCUMENTS

DE    102007042420 A1    1/2009
DE    102014209840 A1    11/2015
(Continued)

OTHER PUBLICATIONS

Machine Translation of FR-3021356-A1 (Year: 2015).*
(Continued)

*Primary Examiner* — Brandon D Lee
(74) *Attorney, Agent, or Firm* — RatnerPrestia

(57) ABSTRACT

A device for diagnosing a particulate filter suitable for: determining a measured pressure time profile, and a theoretical pressure time profile upstream of the filter, implementing, on each profile: low-pass filtering to obtain a first filtered time profile, second low-pass filtering of the first filtered time profile to obtain a second filtered time profile, calculating a difference between the second filtered time profile and the first filtered time profile, obtaining an absolute value of the calculated difference, and calculating an integral of the absolute value, and, from a comparison between the two integrals, a diagnosis of the particulate filter.

11 Claims, 3 Drawing Sheets

(52) U.S. Cl.
CPC ...... *F01N 2550/04* (2013.01); *F01N 2550/24* (2013.01); *F01N 2560/08* (2013.01); *F01N 2900/0418* (2013.01); *F01N 2900/1406* (2013.01); *F01N 2900/1411* (2013.01)

(58) Field of Classification Search
CPC ......... F01N 2560/08; F01N 2900/0418; F01N 2900/1406; F01N 2900/1411
See application file for complete search history.

(56) References Cited

U.S. PATENT DOCUMENTS

| | | | |
|---|---|---|---|
| 2005/0091970 A1 | 5/2005 | Nieuwstadt | |
| 2011/0100094 A1 | 5/2011 | Konrad et al. | |
| 2016/0251995 A1 | 9/2016 | Tsunooka et al. | |
| 2019/0390582 A1 | 12/2019 | Langegger | |
| 2021/0102487 A1 | 4/2021 | Baumann et al. | |

FOREIGN PATENT DOCUMENTS

| | | | | |
|---|---|---|---|---|
| DE | 102018114779 A1 | 12/2019 | | |
| EP | 1092847 A2 | 4/2001 | | |
| EP | 1316693 A1 | 6/2003 | | |
| EP | 3061937 A1 | 8/2016 | | |
| FR | 2799504 A1 | 4/2001 | | |
| FR | 2808559 A1 | 11/2001 | | |
| FR | 2855847 A1 | 12/2004 | | |
| FR | 3021356 A1 | * | 11/2015 | ............. F01N 11/00 |
| FR | 3021356 A1 | 11/2015 | | |
| WO | 2018130459 A1 | 7/2018 | | |
| WO | 2018177897 A1 | 10/2018 | | |
| WO | 2019007639 A1 | 1/2019 | | |

OTHER PUBLICATIONS

International Search Report and Written Opinion for International Application No. PCT/EP2021/059936, dated May 31, 2021, with partial translation, 8 pages.

International Search Report and Written Opinion for International Application No. PCT/EP2021/059936, dated May 31, 2021, 13 pages (French).

English Translation of Written Opinion for International Application No. PCT/2021/059936, dated May 31, 2021, 7 pages.

* cited by examiner

PARTICLE FILTER DIAGNOSTIC DEVICE

CROSS REFERENCE TO RELATED APPLICATIONS

This application is the U.S. National Phase Application of PCT International Application No. PCT/EP2021/059936, filed Apr. 16, 2021, which claims priority to French Patent Application No. 2006122, filed Jun. 11, 2020, the contents of such applications being incorporated by reference herein.

FIELD OF THE INVENTION

The present application relates to a diagnostic device for an internal combustion engine particulate filter, and to a diagnostic method implemented by such a device.

BACKGROUND OF THE INVENTION

Legislation is becoming increasingly strict concerning the emissions of vehicles with internal combustion engines, this legislation setting increasingly lower emission limit values. In order to meet these requirements, various exhaust gas emission reduction strategies must be applied simultaneously, using various components.

In particular, exhaust circuits are commonly provided today with a catalytic converter making it possible to limit emissions of carbon monoxide CO, of nitrogen oxides NOx, and of unburnt hydrocarbons HC. Exhaust circuits also comprise a particulate filter making it possible to reduce fine particle emissions.

Particulate filters for diesel engines have been used for a long time. Fine particles are also produced, in smaller quantities by mass, but in greater numbers at the engine outlet, by gasoline internal combustion engines, and in particular by direct fuel injection engines, in which the fuel is introduced at high pressure directly into the combustion chambers and atomized very finely. For these engines, increasingly strict antipollution standards have also encouraged the massive deployment of particulate filters.

Particulate filters typically comprise a housing and a monolith inserted into the housing, the composition of which makes it possible to trap particles such as soot particles.

It may happen that the particulate filter is removed after installation to reduce vehicle maintenance costs, or that the particulate filter is broken. However, as particulate filters represent an important component in limiting particulate emissions, the standards in force require the ability to reliably detect the absence of a particulate filter or its malfunction.

Several methods have been proposed to implement this type of diagnosis, some being based on the evaluation of the evolution over time of the temperatures of the exhaust gases upstream and downstream of the particulate filter, which involves positioning in the exhaust circuit a thermocouple upstream and a thermocouple downstream of the particulate filter.

Methods are also known, such as for example that described in document FR3121356, incorporated herein by reference, which are based on the exploitation of a differential pressure between the inlet and the outlet of the particulate filter, to detect demounting of the particulate filter. This type of solution involves using an exhaust gas pressure sensor upstream of the particulate filter, and another pressure sensor downstream of the particulate filter.

Also known from document U.S. 2005091970, incorporated herein by reference, is a diagnostic method based on the exploitation of differential pressure, this differential pressure being determined from a pressure measurement carried out by an upstream pressure sensor, and from a pressure drop model making it possible to deduce therefrom a pressure value downstream of the particulate filter.

In all cases, these known methods involve having either two sensors or using a sensor with a downstream pressure estimation. In the first case, the use of more sensors increases the risk of clogging of the sensors, of dispersion, of aging, of water infiltration, or any other phenomenon which degrades the correct operation of the sensors. In addition, this represents an additional cost in equipment, increases the complexity of the system and requires more calibration efforts. In the second case, the diagnosis made is less precise because it is based on a downstream pressure estimation.

SUMMARY OF THE INVENTION

An aspect of the invention is a particulate filter diagnostic device that does not have the drawbacks of the prior art.

In particular, an aspect of the invention is to make it possible to determine the removal of a particulate filter without requiring two sensors arranged respectively upstream and downstream of the particulate filter.

In this respect, an aspect of the invention proposes a device for diagnosing a particulate filter of an exhaust circuit of an internal combustion engine, the exhaust circuit comprising a particulate filter and a pressure sensor suitable for measuring an exhaust gas pressure upstream of the particulate filter, the device comprising a computer suitable for:
  determining a measured pressure time profile upstream of the particulate filter from the pressure sensor,
  determining a theoretical pressure time profile upstream of the particulate filter,
  implementing, on each time profile among the measured pressure time profile and the theoretical pressure time profile, a processing comprising:
    low-pass filtering of the time profile to obtain a first filtered time profile,
    second low-pass filtering of the first filtered time profile to obtain a second filtered time profile,
    calculating a difference between the second filtered time profile and the first filtered time profile,
    obtaining an absolute value of the calculated difference, and
    calculating an integral of the absolute value,
wherein the integral calculating step is implemented if the difference or the absolute value obtained from the theoretical pressure time profile exceeds a first threshold value and if the first filtered theoretical pressure time profile exceeds a second threshold value, and
  from a comparison between the two calculated integrals, establishing a diagnosis of the particulate filter.

In one embodiment, the computer is configured to determine the theoretical pressure time profile upstream of the particulate filter from a flow rate of exhaust gases in the exhaust gas circuit.

In one embodiment, the device further comprises a memory, and the computer is further configured to determine the theoretical pressure time profile upstream of the particulate filter from a polynomial function of the flow rate of exhaust gases in the exhaust gas circuit, said function being stored in the memory.

In one embodiment, the computer is configured to implement the step of calculating an integral of the difference obtained from each time profile over a predetermined time period.

In one embodiment, the computer is configured to stop implementing the step of calculating an integral of the difference obtained from each time profile if the absolute value obtained from the theoretical pressure time profile upstream of the particulate filter exceeds a predetermined third threshold value.

In one embodiment, the computer is configured to compare the integrals by calculating a ratio between the integral obtained from the measured pressure time profile and the integral obtained from the theoretical pressure time profile.

The computer can then be configured to compare the ratio to a fourth threshold value and to determine that the particulate filter is correctly installed if the ratio exceeds said fourth threshold value.

The fourth threshold value can be between 0.8 and 1.1.

An aspect of the present invention also relates to a method for diagnosing a particulate filter in an exhaust circuit of an internal combustion engine, the exhaust circuit comprising a particulate filter and a pressure sensor suitable for measuring an exhaust gas pressure upstream of the particulate filter, the method being implemented by a computer and comprising the implementation of the following steps:
  determining a measured pressure time profile upstream of the particulate filter from the pressure sensor,
  determining a theoretical pressure time profile upstream of the particulate filter,
  implementing, on each time profile among the measured pressure time profile and the theoretical pressure time profile, a processing comprising:
    low-pass filtering of the time profile to obtain a first filtered time profile,
    second low-pass filtering of the first filtered time profile to obtain a second filtered time profile,
    calculating a difference between the second filtered time profile and the first filtered time profile,
    obtaining an absolute value of the calculated difference, and
    calculating an integral of the absolute value,
wherein the integral calculating step is implemented if the difference or the absolute value obtained from the theoretical pressure time profile exceeds a first threshold value and if the first filtered theoretical pressure time profile exceeds a second threshold value, and
  from a comparison between the two calculated integrals, establishing a diagnosis of the particulate filter.

An aspect of the invention also relates to a computer program product, comprising code instructions for implementing the method according to the preceding description, when it is executed by a computer.

Finally, an aspect of the invention relates to an exhaust circuit of an internal combustion engine, comprising: a catalytic converter, a particulate filter arranged downstream of the catalytic converter, a single pressure sensor arranged upstream of the particulate filter, and a device according to the preceding description.

An aspect of the proposed invention goes against an established prejudice according to which the pressure of the exhaust gases upstream of the particulate filter makes it possible, on its own, to diagnose this filter.

It thus makes it possible to establish a diagnosis without recourse to a differential pressure, whether this is calculated from two pressure measurements upstream and downstream of the particulate filter, or whether it is evaluated from a measurement of upstream pressure and from an estimation of the downstream pressure.

BRIEF DESCRIPTION OF THE DRAWINGS

Other features, details and advantages will become apparent on reading the following detailed description and on analyzing the appended drawings, in which.

DESCRIPTION OF THE EMBODIMENTS

Figure 1:
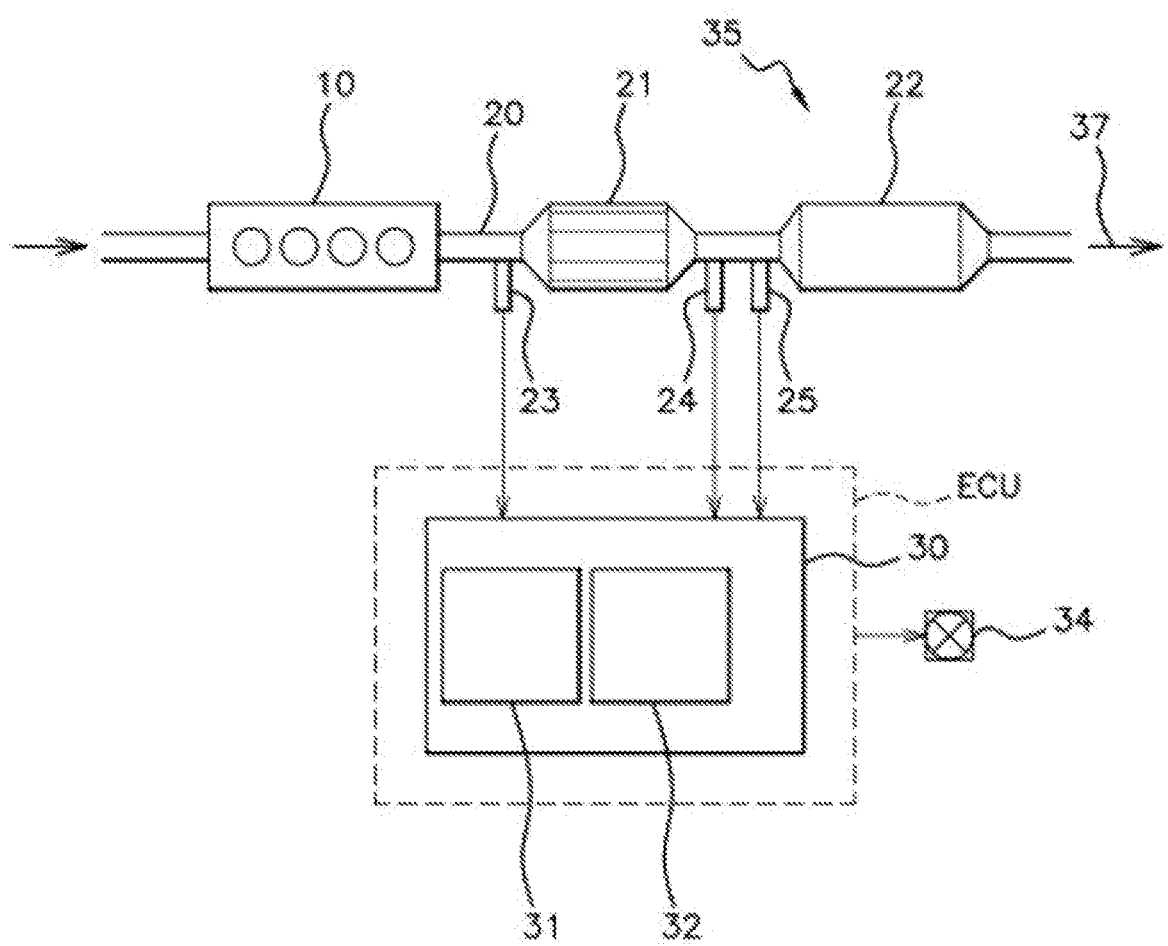
FIG. 1 schematically represents an internal combustion engine comprising a diagnostic device.

Reference is now made to FIG. 1, which schematically represents an internal combustion engine 10 and an exhaust gas circuit 20. The exhaust circuit serves to evacuate and treat the exhaust gases 37 coming from a combustion chamber of the internal combustion engine. It comprises an exhaust gas catalytic converter 21, for example a three-way catalytic converter, and a particulate filter 22 arranged downstream of the exhaust gas catalytic converter. Hereinafter, the terms "upstream" and "downstream" are considered relative to the direction of circulation of the exhaust gases, that is to say from the internal combustion engine to the catalytic converter then to the particulate filter.

The exhaust gas circuit 20 also comprises a first exhaust gas sensor 23, arranged upstream of the catalytic converter 21, and a second exhaust gas sensor 24, arranged downstream of the catalytic converter 21. The first sensor 23 and the second sensor 24 are suitable for determining the properties of the exhaust gases respectively upstream and downstream of the catalytic converter 21, and in particular the quantity of oxygen present in the exhaust gases.

The exhaust gas circuit 20 also comprises a single pressure sensor 25, arranged upstream of the particulate filter 22, and suitable for measuring the pressure of the exhaust gases 2 upstream of the particulate filter. The pressure measurement can be carried out discretely, at predefined time intervals, or continuously, over a certain time period. In all cases, the pressure sensor 25 is suitable for measuring a pressure time profile upstream of the particulate filter 22 over a determined time period. In the case where the pressure measurement is carried out in a discrete manner, the time profile corresponds to the succession of measurements carried out over the time period.

Also represented in FIG. 1 is an engine control unit ECU, which comprises a device 30 for diagnosing the particulate filter, this device comprising a computer 31 and a memory 32. The computer 31 is configured to implement the diagnostic method described below on the basis of code instructions and of parameters described later, which are stored in the memory. The vehicle comprising the engine 10 and the gas exhaust circuit 20 advantageously also comprises an error display 34 connected to the engine control unit ECU, and adapted to signal a particulate filter failure or particulate filter absence detected by the engine control unit ECU. The display 34 can for example be a warning light which lights up if no particulate filter is detected. It can also be a screen displaying an error message if no particulate filter is detected.

Figure 2:
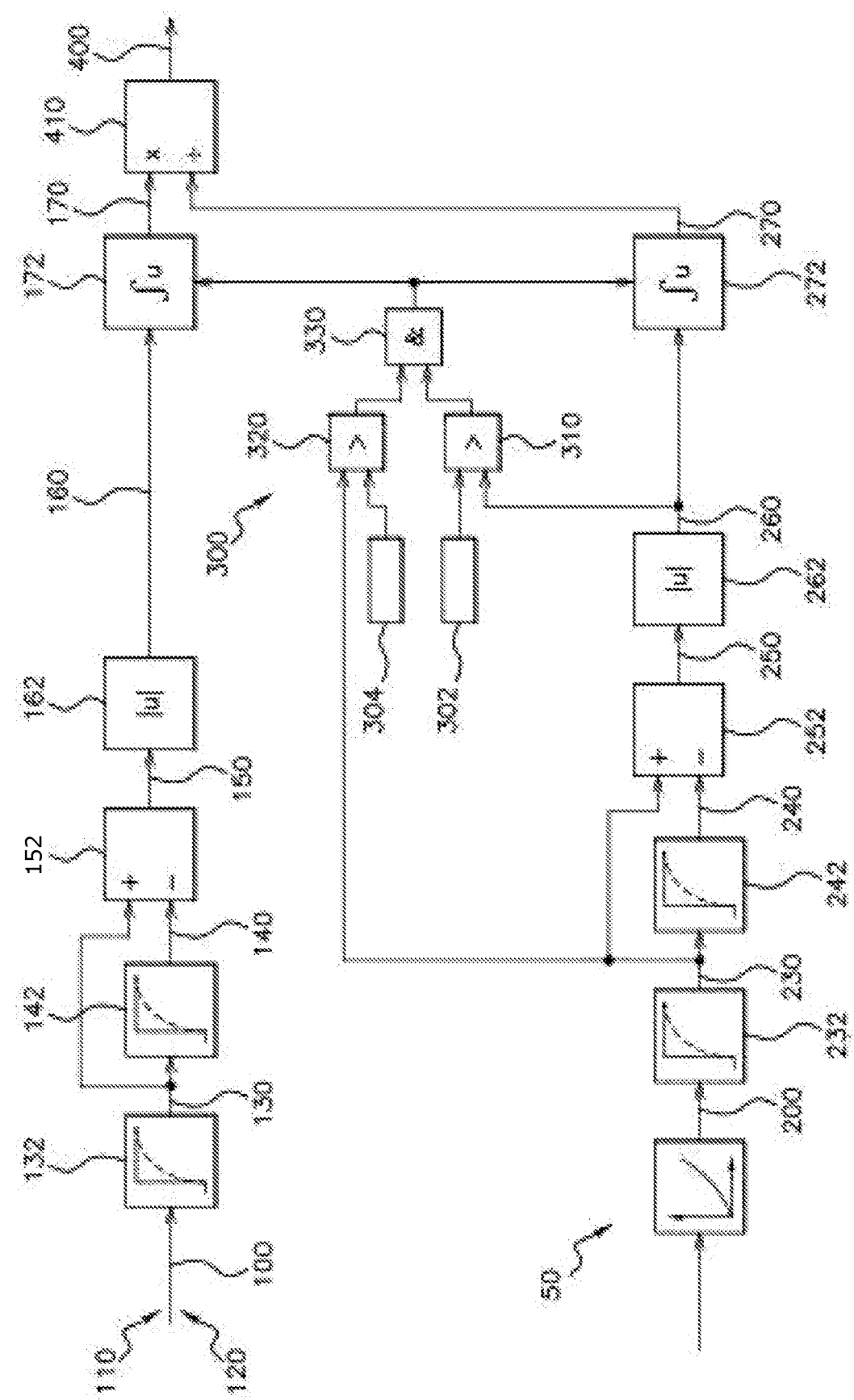
FIG. 2 schematically represents an example of processing implemented for the diagnosis of a particulate filter.

The computer 31 of the control unit ECU is configured to check the presence of the particulate filter 22 by implementing the diagnostic method described below with reference to FIG. 2.

The computer determines a pressure time profile 100, from the measurement of the pressure upstream of the particulate filter over a time period, by the pressure sensor 25.

The measured pressure time profile 100 is then filtered 130 by a low-pass filter 132. The filtered time profile 130 is then again filtered by a second low-pass filter 142 to obtain a second filtered time profile 140 of the pressure measured upstream of the particulate filter. Then, the computer 31 calculates a difference 150 between the first filtered time profile 130, filtered a first time, and the second time profile 140, which has been filtered twice. The block representing the subtraction operation is denoted 152 and the result of this operation is called the difference obtained from the measured pressure time profile 150.

The computer then determines the absolute value 160 of the difference 150, the corresponding block being denoted 162 in the figure. The computer 31 then calculates the integral 170 of the absolute value 160 obtained previously, the corresponding block being denoted 172.

Furthermore, the computer 31 is configured to determine a theoretical pressure time profile 200 upstream of the particulate filter. The theoretical pressure time profile is determined during a step 50 from a volume flow rate of exhaust gases in the exhaust circuit upstream of the particulate filter. This volume flow rate of exhaust gases can be calculated from the mass flow rate of exhaust gases leaving the engine, and from the temperature and from the pressure of the exhaust gases upstream of the filter. The mass flow rate of exhaust gases is itself determined by the engine control according to the operating conditions of the engine.

In one embodiment, the theoretical pressure time profile can be determined by means of a polynomial function, stored in the memory 32, of the volume flow rate of exhaust gases, the polynomial function possibly being of the following form:

$$P_{th} = \beta_1 \dot{V} + \beta_2 \dot{V}^2$$

where $\dot{V}$ is the volume flow rate of exhaust gases upstream of the particulate filter, $P_{th}$ is the theoretical pressure upstream of the particulate filter (a function of time), and $\beta_1$ and $\beta_2$ are two parameters also stored in the memory 32, which are determined for a given engine and particulate filter configuration.

The computer 31 is further configured to implement, on the theoretical pressure time profile 200 upstream of the particulate filter, the same processing as that described above and implemented on the measured pressure time profile 100 upstream of the particulate filter. Thus, the computer 31 performs first low-pass filtering 232 on the profile 200 to obtain a first filtered theoretical pressure time profile 230, then it performs second low-pass filtering 242 on this first filtered profile to obtain a second filtered profile 240.

The computer 31 then calculates during a step 252 (block 252) the difference between the first filtered profile 230 and the second filtered profile 240 obtained from the theoretical pressure time profile, and determines during a step 262 (block 262) the absolute value 260 of this difference. This result 260 is also denoted the difference obtained from the theoretical pressure time profile.

The computer 31 then calculates during a step 272 (block 272) the integral 270 of the difference 260 obtained.

In one embodiment, the computer 31 begins to calculate the integrals 170 and 270 only if the difference 260 obtained from the theoretical pressure time profile 200 is greater than a first threshold value 302, and if the first filtered profile 230 obtained from the theoretical pressure time profile 200 is greater than a second threshold value 304. As the quantities 260 and 230 compared to the threshold values are functions of time, obtained over a determined time period, the comparison is implemented for each value taken in the determined time period by the functions 260 and 230. The first 302 and second 304 threshold values can be stored in the memory 32.

This additional condition established by a prior calibration makes it possible to guarantee that the volume flow rate and the pressure are in a sufficiently high range of values to allow the diagnosis of the particulate filter to be able to take place in a sufficiently robust manner.

In one embodiment, the calculation of the integrals 170 and 270 stops if the time integral of the difference 260 obtained from the theoretical pressure time profile 200 is greater than a third threshold value determined by calibration. This third threshold value can also be stored in the memory.

As a variant, the calculation of the integrals 170 and 270 stops after a time period, determined by calibration, that has elapsed from the start of the integration. These two conditions on stopping the integration, which have not been represented in FIG. 2, can be implemented simultaneously so that the integration stops when the first of these two conditions is fulfilled.

Once the two integrals 170 and 270 have been calculated respectively from the measured pressure time profile and from the theoretical pressure time profile upstream of the particulate filter, the computer 31 performs a comparison 410 of these integrals to establish a diagnosis of the particulate filter. In one embodiment, the comparison 410 is the calculation of a ratio 400 between the integral 170 obtained from the measured pressure time profile, and the integral 270 obtained from the theoretical pressure time profile.

Figure 3:
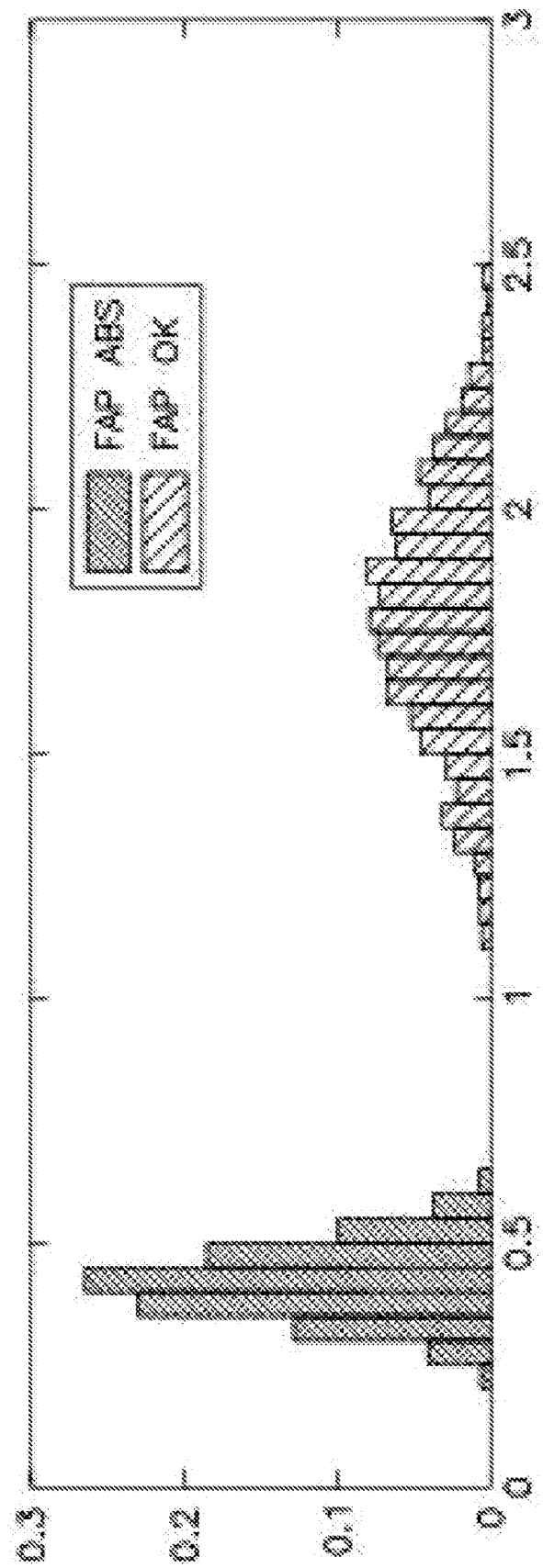
FIG. 3 represents a distribution of ratios calculated for according to the processing represented in FIG. 2 for respectively empty and absent particulate filters.

With reference to FIG. 3, a histogram of the values of the ratios 400 has been represented with particulate filters absent "FAP ABS", and with particulate filters unloaded "FAP OK", this histogram being the result of a Monte-Carlo simulation to study the results of the method as a function of the dispersion of the upstream pressure. The study was conducted for one hundred draws with a random dispersion between plus and minus 10 hPa in the value of the upstream pressure. Unloaded means that the particulate filter contains no soot or ash, i.e. it is new or has just been regenerated. It can be seen in FIG. 3 that the calculated ratios are sufficiently disjoint between the case where the particulate filters are absent and the case where the particulate filters are unloaded to be able to set a threshold value making it possible to establish a diagnosis. For example, the computer 31 can compare the ratio 400 calculated with a fourth threshold value, which can be between 0.8 and 1.1, to establish the diagnosis. If the ratio is lower than this fourth threshold value, the computer 31 determines that the particulate filter is absent, and if the ratio is higher, the computer 31 determines that a particulate filter is present. The fourth threshold value may be stored in the memory, and all of the threshold values may be determined by prior calibration.

If the computer 31 determines the absence of the particulate filter, it can generate an alert, for example by activating a warning light or an error message via the display 34.

It can therefore be seen that, in spite of the prejudices established in the field, it is not necessary to access a pressure value downstream of the particulate filter in order to be able to carry out a diagnosis of the presence or absence of the filter, since the presented processing on the upstream pressure alone makes it possible to discriminate the cases of a present or absent particulate filter with sufficient robustness.

The invention claimed is:

1. A device for diagnosing a particulate filter of an exhaust circuit of an internal combustion engine, the exhaust circuit comprising the particulate filter and a pressure sensor suitable for measuring an exhaust gas pressure upstream of the particulate filter, the device comprising a computer configured to implement:
   determining a measured pressure time profile upstream of the particulate filter from the pressure sensor,
   determining a theoretical pressure time profile upstream of the particulate filter,
   implementing a process for each of the time profile of the measured pressure time profile and the theoretical pressure time profile, the process comprising:
      first low-pass filtering of the time profile to obtain a first filtered time profile,
      second low-pass filtering of the first filtered time profile to obtain a second filtered time profile,
      calculating a difference between the second filtered time profile and the first filtered time profile,
      obtaining an absolute value of the calculated difference, and
      calculating an integral of the absolute value,
      wherein the integral calculating step is implemented if the difference or the absolute value obtained from the theoretical pressure time profile exceeds a first threshold value and if the first filtered theoretical pressure time profile exceeds a second threshold value, and
   establishing a diagnosis of the particulate filter from a comparison between the calculated integrals of the measured pressure time profile and the theoretical pressure time profile.

2. The device as claimed in claim 1, in which the computer is configured to determine the theoretical pressure time profile upstream of the particulate filter from a flow rate of exhaust gases in the exhaust gas circuit.

3. The device as claimed in claim 1, further comprising a memory, the computer being further configured to determine the theoretical pressure time profile upstream of the particulate filter from a polynomial function of the flow rate of exhaust gases in the exhaust gas circuit, said function being stored in the memory.

4. The device as claimed in claim 1, in which the computer is configured to implement the step of calculating an integral of the difference obtained from each time profile over a predetermined time period.

5. The device as claimed in claim 1, in which the computer is configured to stop implementing the step of calculating an integral of the difference obtained from each time profile if the absolute value obtained from the theoretical pressure time profile upstream of the particulate filter exceeds a predetermined third threshold value.

6. The device as claimed in claim 1, in which the computer is configured to compare the integrals by calculating a ratio between the integral obtained from the measured pressure time profile and the integral obtained from the theoretical pressure time profile.

7. The device as claimed in claim 6, in which the computer is configured to compare the ratio with a fourth threshold value and to determine that the particulate filter is correctly installed if the ratio exceeds said fourth threshold value.

8. The device as claimed in claim 7, in which the fourth threshold value is between 0.8 and 1.1.

9. A method for diagnosing a particulate filter in an exhaust circuit of an internal combustion engine, the exhaust circuit comprising the particulate filter and a pressure sensor suitable for measuring an exhaust gas pressure upstream of the particulate filter, the method being implemented by a computer and comprising:
   determining a measured pressure time profile upstream of the particulate filter from the pressure sensor,
   determining a theoretical pressure time profile upstream of the particulate filter,
   implementing a process for each of the time profile of the measured pressure time profile and the theoretical pressure time profile, the process comprising:
      first low-pass filtering of the time profile to obtain a first filtered time profile,
      second low-pass filtering of the first filtered time profile to obtain a second filtered time profile,
      calculating a difference between the second filtered time profile and the first filtered time profile,
      obtaining an absolute value of the calculated difference, and calculating an integral of the absolute value,
      wherein the integral calculating step is implemented if the difference or the absolute value obtained from the theoretical pressure time profile exceeds a first threshold value and if the first filtered theoretical pressure time profile exceeds a second threshold value, and
   establishing a diagnosis of the particulate filter from a comparison between the calculated integrals of the measured pressure time profile and the theoretical pressure time profile.

10. A non-transitory computer program product, comprising code instructions for implementing the method as claimed in claim 9, when it is executed by a computer.

11. An exhaust circuit of an internal combustion engine, comprising: a catalytic converter, a particulate filter arranged downstream of the catalytic converter, a single pressure sensor arranged upstream of the particulate filter, and a device as claimed in claim 1.

* * * * *